April 19, 1949.  R. DE O. McDILL  2,467,562
METHOD AND APPARATUS FOR MAGNETICALLY
TESTING VALVES FOR SODIUM CONTENT
Filed June 21, 1943  2 Sheets-Sheet 1
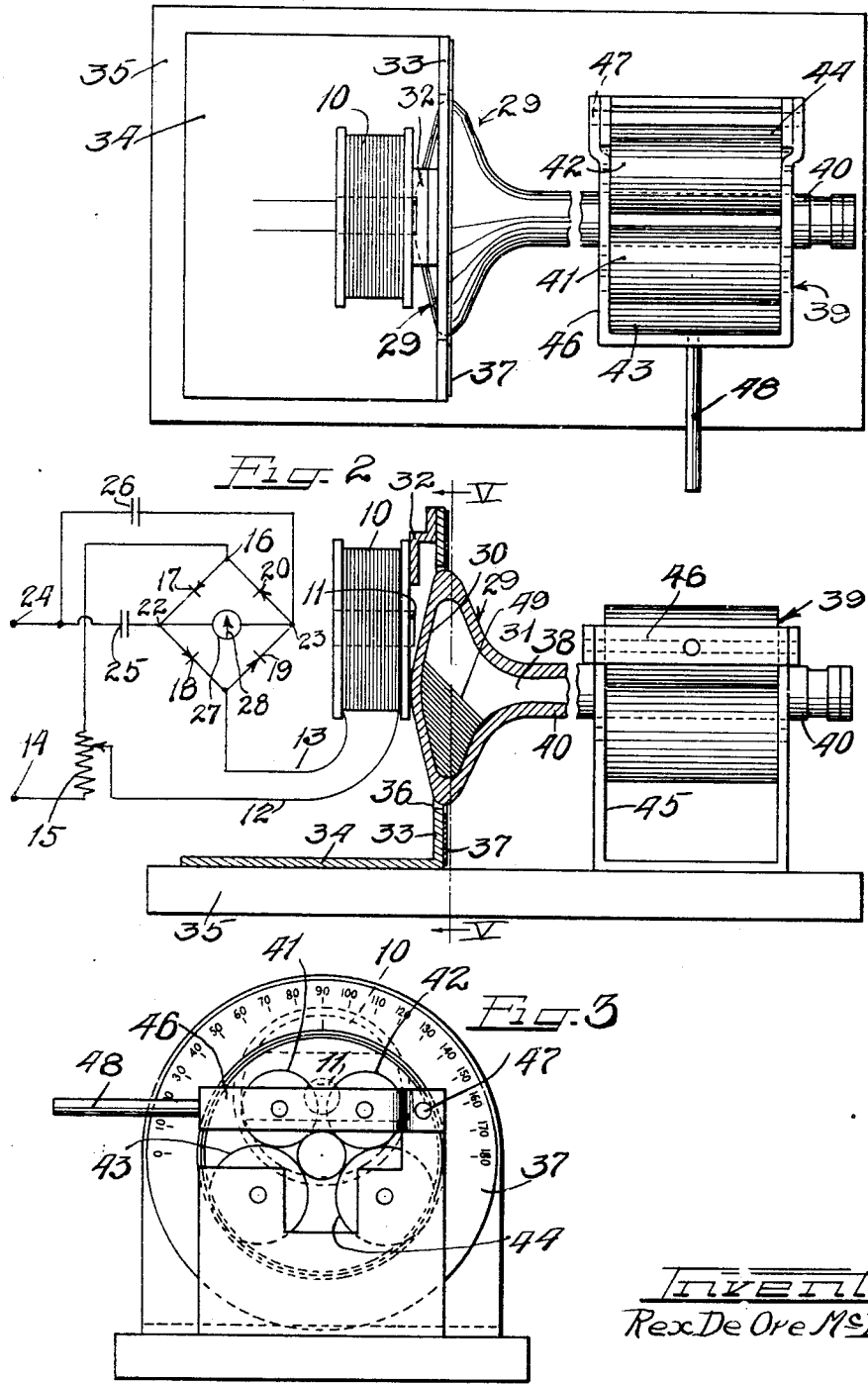
Inventor
Rex De Ore McDill.
by Charles W. Hills Attys.

April 19, 1949.       R. DE O. McDILL       2,467,562
METHOD AND APPARATUS FOR MAGNETICALLY
TESTING VALVES FOR SODIUM CONTENT
Filed June 21, 1943                    2 Sheets-Sheet 2
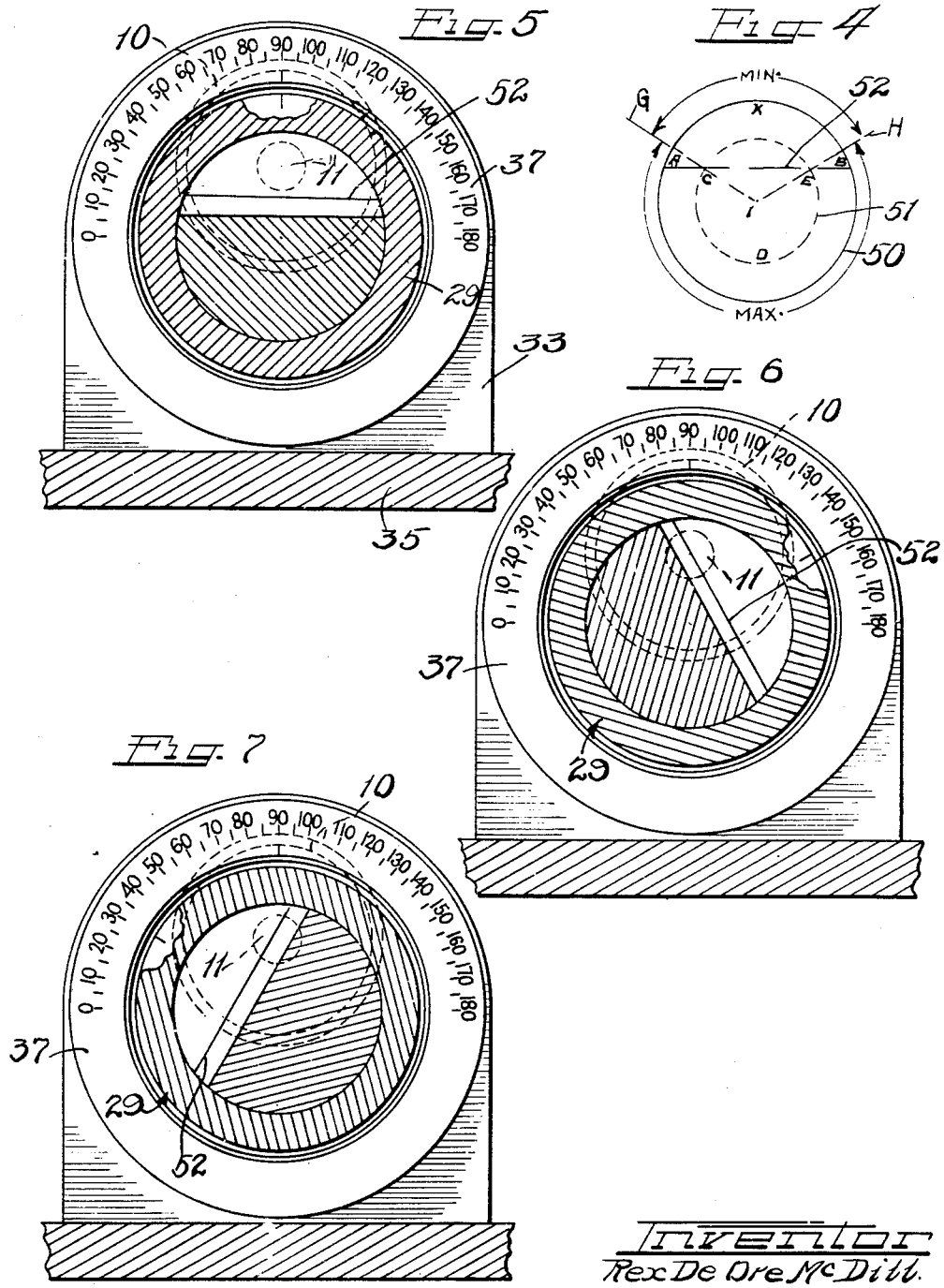
Inventor
Rex De Ore McDill
by Charles W. Hills Attys.

Patented Apr. 19, 1949

2,467,562

UNITED STATES PATENT OFFICE 2,467,562

METHOD AND APPARATUS FOR MAGNETICALLY TESTING VALVES FOR SODIUM CONTENT

Rex De Ore McDill, Cleveland, Ohio, assignor to Thompson Products, Inc., Cleveland, Ohio, a corporation of Ohio Application June 21, 1943, Serial No. 491,666

9 Claims. (Cl. 175—183)

This invention relates to a novel method and means for checking a valve for its sodium content and more particularly to one which may be employed in connection with measuring and detecting apparatus for locating the presence of sodium behind a valve wall by an eddy current penetration method.

Many valves which are manufactured today are formed with a completely closed off cavity within their head and stem and this cavity is partially filled with sodium. In order that the valves may have uniform operation in use, it is desirable and necessary that all valves have substantially the same sodium content.

Since the total volume of the cavity of a valve is known in advance, I have found a convenient and rapid method for checking sodium filled valves for their sodium content by first causing the sodium to be bumped down into the head of the valve so that the upper surface of the sodium lies in a plane of 45° (or some other convenient angle) to the longitudinal axis of the valve stem, and then noting the position of the sodium line across the valve head by some external detector means.

It is an object of the present invention to provide a novel method and means for checking valves for their sodium content in the manner above referred to.

It is a further object of the present invention to provide a novel apparatus for holding and rotating a valve in proximity to a detector coil.

Another object of the present invention is to provide a novel method and means for locating the meniscus line of sodium in a valve.

Another and still further object of the present invention is to provide a novel method and means for determining the content of a material contained in a closed cavity of a metallic structure where the volume of the closed cavity is known in advance.

The novel features which I believe to be characteristic of my invention are set forth with particularity in the appended claims. My invention itself, however, both as to its manner of construction and method of operation, together with further objects and advantages thereof, may best be understood by reference to the following description, taken in connection with the accompanying drawings, in which:

Figure 1 is an apparatus embodying novel features of the present invention and arranged to carry out the novel method of the present invention;

Figure 2 is an elevation of the apparatus shown in Figure 1 with a portion of the valve and the plate through which it extends broken away, together with a diagrammatic illustration of the electric circuit of the detector coil;

Figure 3 is a right end view of the apparatus shown in Figure 2;

Figure 4 is a diagrammatic representation illustrating how the novel method of the present invention is carried out;

Figure 5 is a sectional view of the apparatus shown in Figure 2 as taken along the line V—V thereof;

Figure 6 is a view similar to Figure 5 but with the valve rotated about its longitudinal axis in a clockwise direction as viewed in Figure 5 of the drawings until the meniscus line of the sodium lies directly opposite the center of the detector coil; and Figure 7 is a view similar to Figure 5 but with the valve rotated about its longitudinal axis in a counter-clockwise direction until the meniscus line of the sodium lies directly opposite the center of the detector coil.

Referring now to Figures 1, 2 and 3 of the drawings, there is illustrated therein apparatus for mounting and rotating a valve and there is also illustrated, in Figure 2, diagrammatically, the manner in which the detector coil of the apparatus is energized.

Considering first the wiring diagram portion of Figure 2, there is illustrated therein a detector coil 10 in the form of a solenoid having a powdered iron core member 11. The detector coil 10 is arranged to be supplied with alternating current of predetermined frequency through conductors 12 and 13, and it is also arranged in a bridge circuit for detecting changes in the inductance thereof. More particularly, the conductor 12 is connected to one terminal of a source of alternating current indicated by the reference character 14. Terminal 14 is also connected through a variable resistor 15 to a corner 16 of a four sided rectifier loop having dry rectifiers 17, 18, 19 and 20 therein. The rectifier loop made up of rectifiers 17 to 20 is so arranged that current can flow around the loop in one direction only. The point 21 of the loop opposite to the point 16 is connected to conductor 13 of the detector coil 10. The remaining corners of the rectifier loop are indicated by the reference characters 22 and 23. The other side of the alternating current source is represented by the terminal 24. This terminal 24 is connected through condensers 25 and 26 to corners 22 and 23 respectively of the rectifier loop. A milli-ammeter 27 is connected diagonally across the rectifier loop between corners 22 and 23.

The variable resistor 15 is adjusted so that the needle 28 of the meter 27 is set in a zero position when no valve is disposed opposite the end of the detector coil 10.

When a valve 29 is brought into position opposite the end of the detector coil 10, the inductance of the detector coil 10 is changed. It has further been found that the change in the inductance will be different when the head 30 of the valve 29 is backed up by sodium 31 than when no sodium lies directly behind the head 30.

Details of the novel circuit arrangement which is only diagrammatically represented in Figure 2, and the manner in which sodium is detected in a valve is described and claimed in my copending application entitled "Measuring device and method," U. S. Serial No. 491,664, filed June 21, 1943, and assigned to the same assignee as the present invention. For the purpose of understanding the present invention it is only necessary to know that the detector coil 10 shall cause a much greater deflection of the needle 28 of the meter 27 when sodium is behind the wall of the head 30 than when no sodium lies therebehind. This feature is taken advantage of in a manner which will now be described.

The detector coil 10 is mounted on a bracket 32 carried by an upright plate 33 having a foot 34 secured to a base member 35. The plate 33 is provided with an opening 36 which is slightly larger than the maximum diameter of the head of the valve 29. A flat annulus 37 having a scale marked off in degrees is disposed on the face of the plate 33 around the opening 36, preferably on the side opposite to that on which detector coil 10 is mounted. The center of this circular opening 36 does not lie opposite the center of the detector coil 10 but rather is spaced therefrom by an amount less than the maximum inside radius of the cavity opening in the valve head 30. The valve itself is arranged to be mounted in a chuck 39 which is designed to permit angular movement of the valve 29 about the longitudinal axis of its stem 40. The chuck 39 includes a pair of upper rollers 41 and 42 and a pair of lower rollers 43 and 44. The lower rollers 43 and 44 are journalled in a U-shaped bracket 45 while the upper rollers 41 and 42 are journalled in a yoke member 46 which is pivotally mounted on the bracket 45 as at 47. A handle 48 is provided on the yoke 46 for readily lifting the upper rollers 41 and 42 away from the lower rollers 43 and 44 to permit insertion of the valve stem 40 between the upper and lower rollers.

One of the important steps of the present method is to cause substantially all of the sodium 31 within the valve 29 to be shifted within the valve cavity to one corner of the head of the valve so that its surface 49 within the valve cavity 38 lies in a plane at a known angle to the longitudinal axis of the valve stem 40. By way of illustration and not by way of limitation, the sodium in the valve 29 is shown as having been shifted to a position where its surface 49 lies in a plane disposed at a 45° angle with respect to the longitudinal axis of the valve stem 40. This may be conveniently done in any suitable manner such for example as by heating the valve and simultaneously vibrating the valve while holding it disposed with the longitudinal axis of the valve stem at a 45° angle with respect to the horizontal, as described in detail and claimed in my copending application for patent entitled "Valve vibrator and heater," U. S. Serial No. 491,665, filed June 21, 1943, now Patent No. 2,400,158, granted May 14, 1946, and assigned to the same assignee as the present invention.

When it is the desire to determine the sodium content of a larger number of valves all having the same cavity volume, the valves are first heated and vibrated as described above. The valve is then inserted in the chuck 39 and the detector coil is energized by an alternating current of some suitable frequency such for example as a frequency of the order of magnitude of a hundred or two hundred cycles per second. The valve stem 40 then is rotated slowly by hand through 360°.

Due to the fact that the sodium contained in the valve 29 lies immediately behind only a portion of the head 30 then upon rotation of the valve about its axis and relative to such coil through a complete revolution, the meter 27 will not give the same indication throughout this rotational movement of the valve. This is believed to be due to the fact that the apparent inductance of the coil 10 is altered by the presence of sodium immediately behind the wall of valve head 30. Stated in a somewhat different manner, the apparent inductance of the coil 10 is changed by the presence of the metal of the valve head wall within the magnetic field of the detector coil 10. When the metal of the valve head wall is backed up by sodium and is disposed within the magnetic field of coil 10, the coil 10 has a different apparent inductance than when only the metal wall alone is present. This feature is taken advantage of to locate the sodium line within the valve, for if the sodium line is located and the volume of the valve cavity is known, it is simple to provide an empirically calibrated chart giving the sodium content of the valve.

One embodiment of my novel method for locating the sodium line is first to shift all of the sodium within the valve 29 into one corner as above described, so as to have the surface 49 of the sodium line in a plane whose angle with respect to the axis of the valve stem 40 is known. The valve stem 40 is then mounted in the chuck 39, the circuit of Figure 2 energized as described, and the valve slowly rotated through 360°. By way of explanation, the face of the valve head 30 is illustrated in Figure 4 by the solid circle marked 50. The center of the detector coil 10 has relative movement with respect to the valve head (due to the rotation of the head) along a circular path indicated by the dotted line 51. So long as the center of the coil 10 is opposite the region where sodium lies behind the valve head wall, or in other words, over the portion of the circular path 51 marked CDE, a maximum reading on the meter 27 will be noted. Over the region determined by the portion EFC of the path 51 a minimum reading of the meter 27 is noted.

The precise locations of the points C and E are determined in the following manner. First the general region of minimum readings as distinguished from maximum readings is noted and a distinguishing mark is placed on the valve head such as by marking the minimum region with an "X" as shown in Figure 4. Next mark on the edge of the valve the two places where there is a sharp change in readings in the meter 27 by marks "A" and "B." There will be two such occurrences due to the fact that the coil in its relative movement along path 51 will pass from a region of no sodium to a region of sodium and also will pass from a region of sodium to a region of no sodium. If the sodium line in the valve is considered as the solid straight line 52 in Figure 4, it will be observed that this sodium line intersects the circular path 41 of relative movement of the coil 10 at two points "C" and "E." When the points "A" and "B" are noted or marked on the valve head, it will be apparent that the sodium line is readily determined by drawing two lines "G" and "H" from the center of circles 50 and 51 and noting where they intersect the circle 51, the radius of the circle 51 being determined by the offset spacing of the center of coil 10 from the center of rotation of the valve stem 40. A straight line drawn through the intersecting points ("C" and "E") gives the sodium line.

This may be quickly done in a practical manner by means of the 180° scale 37 on the apparatus described in Figures 1 to 3 of the drawings. Referring to Figures 5, 6 and 7 which are sectional views through the valve head looking toward the scale 37, the sodium line against the rear face of the valve head wall 30 is given by the reference character 52. Let us assume that the region of minimum readings has been determined as described in connection with Figure 4 and that the valve has been rotated to place this minimum region uppermost as shown in Figure 5. The valve is now rotated in a clockwise direction until a sharp change is noted in the meter readings. This will occur when the sodium line 52 reaches the center of the core 11 as shown in Figure 6. A mark is now made at the edge of the valve head immediately below the 90° mark on scale 37. The valve is now rotated in a counter-clockwise direction until another sharp change in meter readings occurs, and a second mark is placed at the edge of the valve head under the 90° mark on scale 37. These two marks will correspond to marks "A" and "B" in Figure 4. The valve is now rotated back until one of the marks lies opposite the 0° mark on scale 37 and the other mark lies somewhere along the scale. The location of this second mark is noted in terms of degrees and this gives the angle between the lines "G" and "H."

From tables previously provided for valves of this size and for a testing coil spaced at the particular distance from the axis of rotation of the valve, the sodium content may be read directly.

In the above described embodiment of the invention, the sodium is bumped into the head of the valve so that the free surface of the sodium lies in a plane disposed at an angle of 45° with respect to the stem axis. This angle may, of course, be varied through wide limits without departing from the spirit and scope of the present invention. I have found that in certain types of valves that an angle of 30° is more satisfactory. This angle will, of course, depend upon the relative amount of sodium contained in the valve as compared with the volume of the valve cavity.

Valves may also be checked for their sodium content by causing the sodium to be moved into the stem and skirt portion of the valve rather than in the head portion, it only being necessary that the surface of the sodium after it has been moved shall lie in a plane disposed at an angle to the axis of rotation of the valve during the test operation. In all cases the sodium content may be readily determined after the angle between the two points on the valve located by the detector coil, which denote the line of demarcation between a region of sodium and a region of no sodium, has been determined. After this angle has once been determined the sodium content may be read directly from a table of values which have been determined from similar sized valves of known sodium content.

While I have shown and described particular embodiments of my invention, it will, of course, be understood that I do not wish to be limited thereto, since many modifications may be made, and I therefore contemplate by the appended claims to cover all such modifications as fall within the true spirit and scope of my invention.

I claim as my invention:

1. The method of checking a hollow member for the amount of its contents which includes positioning the contents in one portion of the cavity of the member with the free surface disposed in a plane at a known angle to one of the principal axes of the member, and rotating said member about said axis in a magnetic field and detecting the variable effects on said field thereby locating the line where said plane lies on the face of one end of the member.

2. The method of checking a hollow valve for the amount of its contents which includes positioning the contents in one portion of the valve cavity with the free surface of the contents disposed in a plane at a known angle to the longitudinal axis of the valve, and rotating the valve about said axis in an alternating magnetic field and detecting the eddy current effects thereof on said field thereby locating a line where said plane lies on the face of the valve head.

3. The method of checking a hollow valve for the amount of its sodium content which includes positioning all of the sodium in one portion of the valve head cavity with the free surface of the sodium disposed in a plane at a known angle to the longitudinal axis of the valve; disposing the valve head in the path of a localized magnetic field for detecting the presence of sodium immediately behind the valve head wall, rotating the valve about its stem axis with the most intense portion of the localized magnetic field displaced radially a known distance from the axis of rotation, and detecting the two angular positions of the valve where the sodium line occurs, thereby locating a line where said sodium surface plane intersects the valve head wall.

4. The method of checking a hollow valve for the amount of its sodium content which includes positioning the sodium in one portion of the valve head cavity with the free surface of the sodium lying in a plane at a substantial angle to the axis of the valve stem, disposing the valve head opposite a localized electromagnetic alternating field serving as a sodium detector which field is displaced radially a known distance from the stem axis, turning the valve about its stem axis and by observing the effects of said field, detecting the general region where no sodium lies behind the valve head wall, and detecting the two points on the valve head wall as determined by the detector means where the portion of the valve head opposite the center of the detector means passes from a sodium region to a no-sodium region and from a no-sodium region to a sodium region.

5. Apparatus for determining the amount of sodium enclosed by a valve having a head and stem comprising means for rotatably supporting a valve by its valve stem, a detector coil mounted in proximity to said supporting means and positioned so as to lie opposite the valve head when the valve is supported in said supporting means, the center of said detector coil being displaced radially from the axis of rotation of said valve in said supporting means, and means for passing low frequency alternating current through said detector coil, said last mentioned means including means for indicating any change in the apparent impedance of said coil produced by rotating said valve.

6. Apparatus for determining the amount of sodium enclosed by a valve having a head and stem comprising means for rotatably supporting a valve by its valve stem, a detector coil mounted in proximity to said supporting means and positioned so as to lie opposite the end of the valve head when the valve is supported in said supporting means, the center of said detector coil being displaced radially from the axis of rotation of said valve in said supporting means, a plate member having an end defining an opening concentric with the head of the valve to be tested, a scale marked off in degrees extending at least part way around said opening, means for passing low frequency alternating current through said detector coil, said last mentioned means including means for indicating any change in apparent inductance of said coil as said valve rotates whereby the presence or absence of sodium immediately behind that portion of the valve head wall lying opposite the detector coil may be determined.

7. Apparatus for determining the contents of a hollow valve of the type having an enlarged head and a stem comprising a supporting member, a chuck mounted on said member for rotatably supporting said valve by its stem for turning movement about its stem axis, an electromagnetic detector coil mounted on said member with its axis or line of greatest magnetic field concentration displaced from the axis of turning movement of said valve, a plate on said supporting member between said coil and said chuck having a circular opening slightly larger than the maximum diameter of said valve head and in which the valve head lies when a valve is mounted in said chuck, the center of said opening being coincident with the axis of rotation of said valve, and scale means on said plate extending at least partially around said opening.

8. Apparatus for determining the contents of a hollow valve of the type having an enlarged head and a stem comprising a supporting member, a chuck mounted on said member for rotatably supporting said valve by its stem for turning movement about its stem axis, an electromagnetic detector coil mounted on said member with its axis or line of greatest magnetic field concentration displaced from the axis of turning movement of said valve, means for energizing said detector coil with low frequency alternating current said last mentioned means including, means for indicating any change in apparent impedance of said detector coil as said valve rotates, a plate on said supporting member between said coil and said chuck having a circular opening slightly larger than the maximum diameter of said head, and in which the valve head lies when a valve is mounted in said chuck, the center of said opening being substantially coincident with the axis of rotation of said valve, and scale means on said plate extending at least partially around said opening.

9. The method of determining the amount of electrically conductive contents within a hollow member which includes positioning the contents in one portion of the cavity of the member with the free surface of the contents disposed at a known angle to a selected axis of the hollow member, producing a magnetic field of sufficient intensity to penetrate the wall of said hollow member, and producing a relative rotation of said magnetic field and said hollow member about said selected axis, and detecting the changes in said magnetic field produced by the relative rotation.

REX DE ORE McDILL.

REFERENCES CITED

The following references are of record in the file of this patent:

UNITED STATES PATENTS

| Number | Name | Date |
| --- | --- | --- |
| 1,429,606 | Marsland | Sept. 19, 1922 |
| 1,792,999 | Messner | Feb. 17, 1931 |
| 1,807,411 | Imes | May 26, 1931 |
| 1,952,185 | Smith | Mar. 27, 1934 |
| 1,964,141 | Rhodes et al. | June 26, 1934 |
| 1,983,388 | Moore | Dec. 4, 1934 |
| 2,008,046 | Snelling | July 16, 1935 |
| 2,334,393 | Dillon | Nov. 16, 1943 |
| 2,336,417 | Petersen | Dec. 7, 1943 |

FOREIGN PATENTS

| Number | Country | Date |
| --- | --- | --- |
| 164,977 | Great Britain | June 23, 1921 |
| 267,462 | Great Britain | Sept. 23, 1927 |